UNITED STATES PATENT OFFICE.

OTTO DIEFFENBACH AND EDUARD C. MARBURG, OF GRIESHEIM-ON-THE-MAIN, GERMANY, ASSIGNORS TO CHEMISCHE FABRIK GRIESHEIM ELECTRON, OF FRANKFORT-ON-THE-MAIN, GERMANY.

IGNITING COMPOSITION FOR MATCHES.

No. 795,587. Specification of Letters Patent. Patented July 25, 1905.

Application filed August 17, 1903. Serial No. 169,736.

*To all whom it may concern:*

Be it known that we, OTTO DIEFFENBACH and EDUARD C. MARBURG, subjects of the German Emperor, and residents of and having our post-office address at 11 Hochstrasse, Griesheim-on-the-Main, Germany, have invented certain new and useful Improvements in Igniting Compositions for Matches, of which the following is a specification.

This invention consists in the employment of suboxid of phosphorus ($P_4O$) (see *Watt's Dictionary of Chemistry*, London, 1877, Vol. IV, page 523) in the preparation of the igniting composition for matches. Suboxid of phosphorus can be readily and cheaply prepared by dissolving yellow phosphorus in carbon tetrachlorid and passing dry air through the slightly-heated solution, suboxid of phosphorus being precipitated in the form of a very fine yellow powder (see *Dammer's Manual of Inorganic Chemistry*, Vol. IV, page 319.)

Matches manufactured with suboxid of phosphorus in the igniting composition are readily ignited by striking them on either hard or soft surfaces—such as cloth, for example—and suboxid of phosphorus is therefore more suitable for the manufacture of readily-ignitible matches than are any of the bodies hitherto proposed as substitutes for yellow phosphorus.

Suboxid of phosphorus has the great advantage over compounds of sulfur and phosphorus that it is not decomposed by water even if boiled therewith. In contact with moist air suboxid of phosphorus undergoes a very slow oxidation, just as red phosphorus does; but as the suboxid of phosphorus is in the match surrounded by a layer of glue or the like excluding the air an alteration of the suboxid of phosphorus in the match itself cannot take place. The igniting composition prepared with suboxid of phosphorus can be so light in color that the composition can be colored by the addition to it of any required coloring-matter.

While igniting compositions may vary widely in the nature of their constituents, they consist, essentially, of a firing compound which may be ignited by friction or otherwise, an inactive material operating as a diluent— such as chalk, powdered glass, and the like—and a binder, such as glue, for holding the constituent ingredients of the composition together and securing them to the matchstick.

The following are examples of how this invention may be carried out in practice; but the invention is not limited to these examples.

I. Light-colored igniting compositions to which coloring-matter may be added:

1. Ten parts suboxid of phosphorus, forty parts potassium chlorate, seven parts chalk, twenty-five parts powdered glass, five parts colophony, eighteen parts glue.

2. Ten parts suboxid of phosphorus, forty parts potassium chlorate, six parts gypsum, four parts chalk, twenty-five parts powdered glass, sixteen parts glue. This is the preferred composition, as the addition of gypsum makes the matches more durable and gives a flame which is not blackening, and also the mass can be colored at will.

II. Dark-colored igniting compositions:

1. Ten parts suboxid of phosphorus, fifty-eight parts potassium chlorate, five parts lead dioxid, five parts chalk, twenty-five parts powdered glass, two parts colophony, sixteen parts glue.

2. Ten parts suboxid of phosphorus, fifty-eight parts potassium chlorate, seven parts ferric oxid, five parts chalk, twenty-five parts powdered glass, sixteen parts glue.

We claim—

1. An igniting composition containing suboxid of phosphorus and gypsum.

2. An igniting composition containing suboxid of phosphorus, potassium chlorate and gypsum.

3. An igniting composition containing suboxid of phosphorus, potassium chlorate, a diluent, a binder and gypsum.

In testimony whereof we have signed our names to this specification in the presence of two subscribing witnesses.

OTTO DIEFFENBACH.
EDUARD C. MARBURG.

Witnesses:
FRANZ HASSLACHER,
MICHAEL VOLK.